April 2, 1963
C. A. URIAN
3,083,784
MOVABLE STAIR ASSEMBLY
Filed July 26, 1961
9 Sheets-Sheet 1
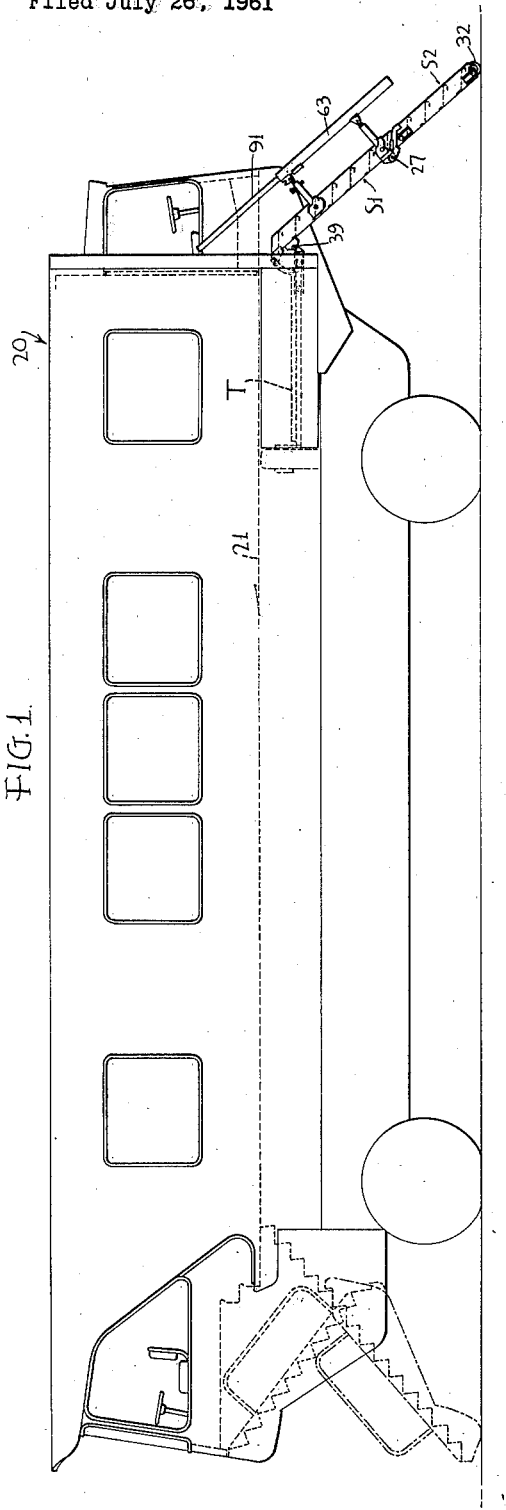
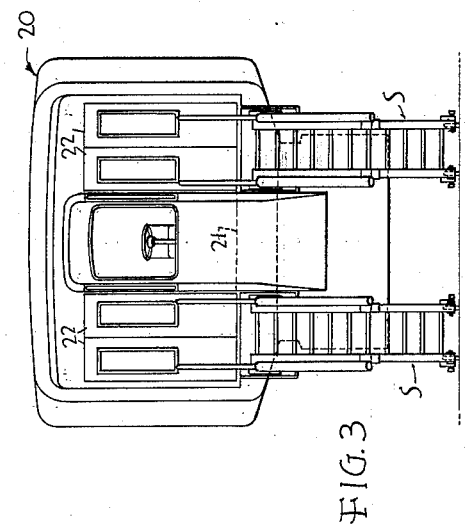
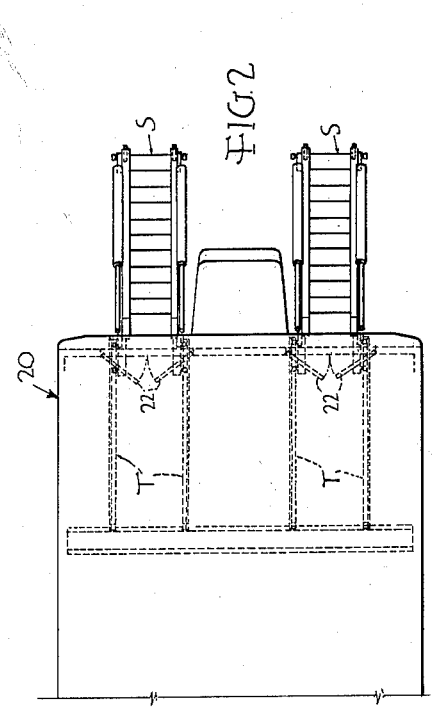
INVENTOR.
Charles A. Urian.
BY
Wm. R. Slisson
ATTORNEY April 2, 1963  C. A. URIAN  3,083,784
MOVABLE STAIR ASSEMBLY
Filed July 26, 1961  9 Sheets-Sheet 2

INVENTOR.
Charles A. Urian.
BY
Wm. B. Glisson
ATTORNEY

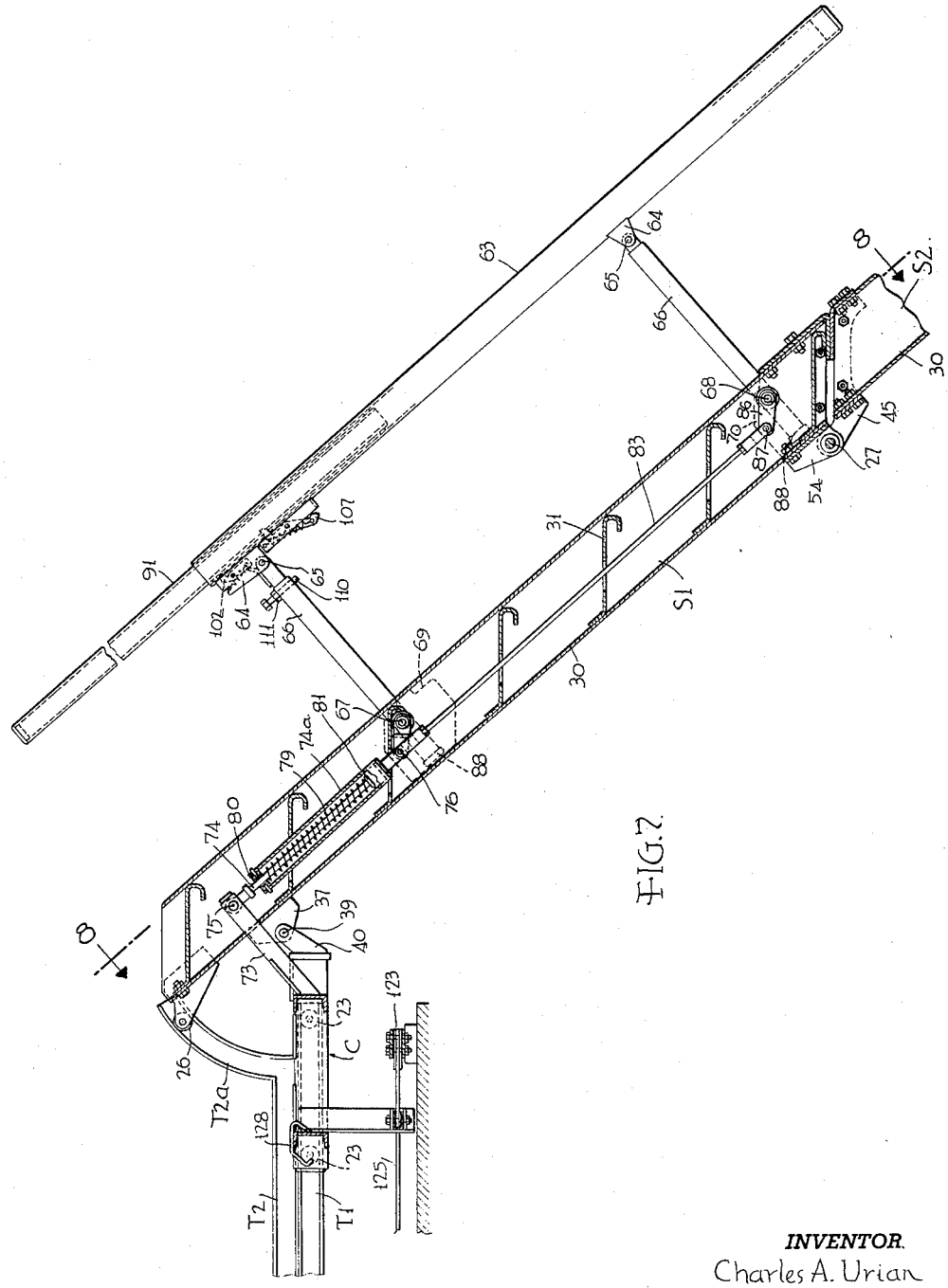

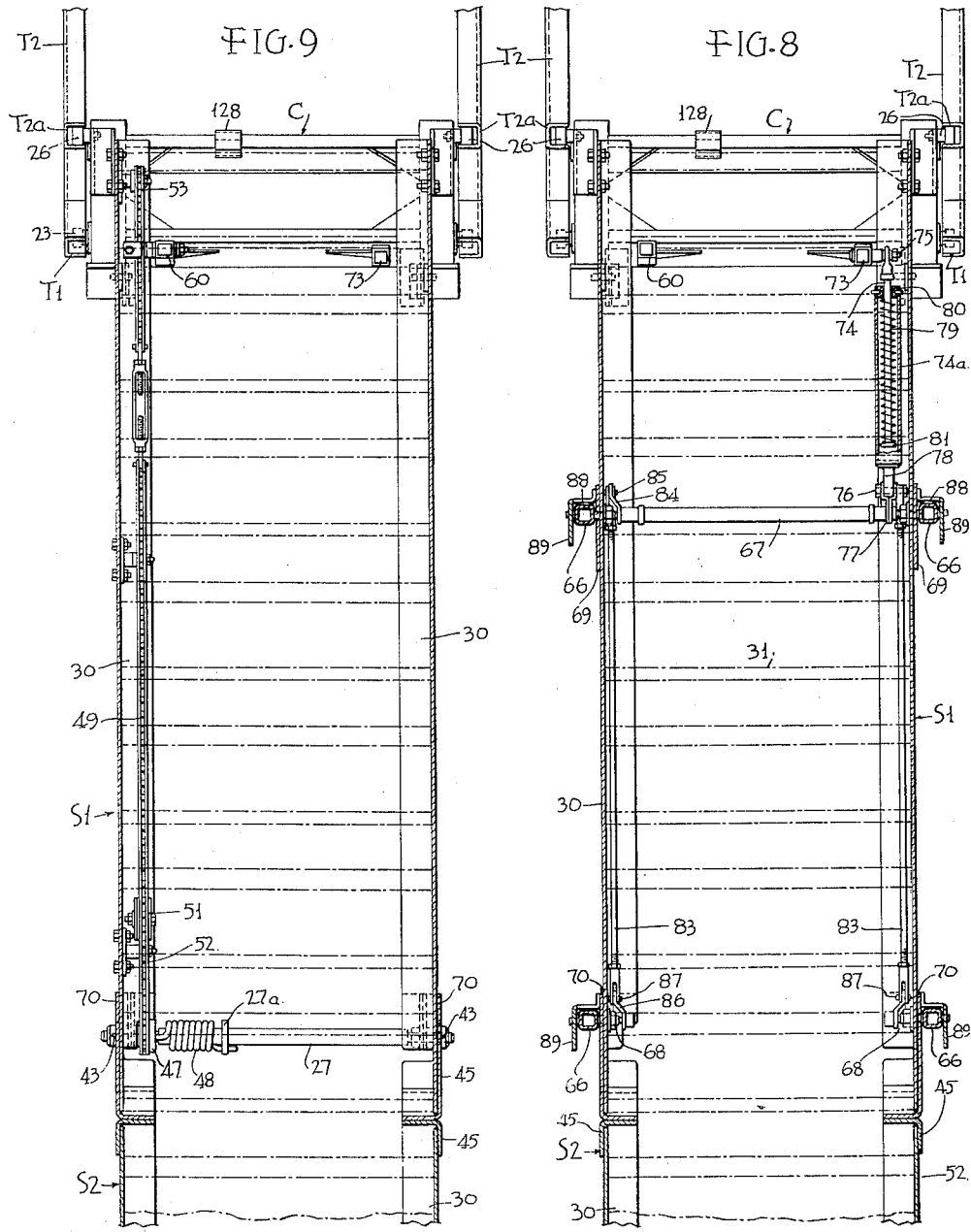

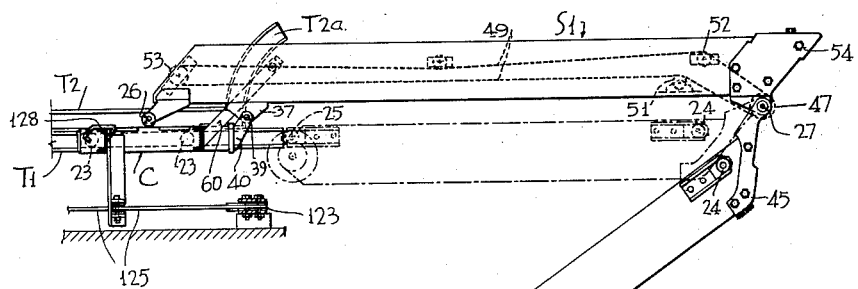
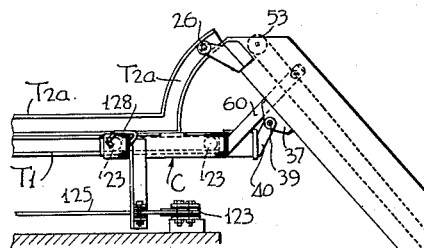

April 2, 1963

C. A. URIAN 3,083,784

MOVABLE STAIR ASSEMBLY

Filed July 26, 1961

INVENTOR.
Charles A. Urian.
BY
Wm. R. Glisson
ATTORNEY

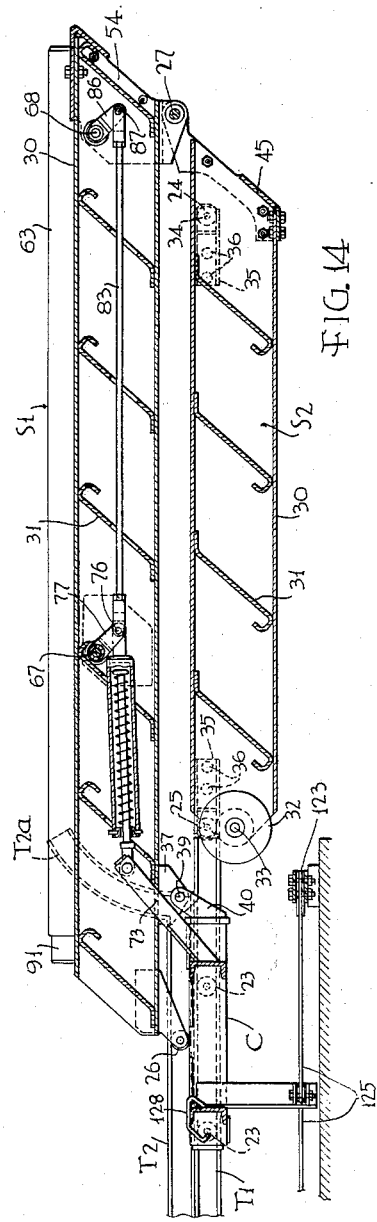
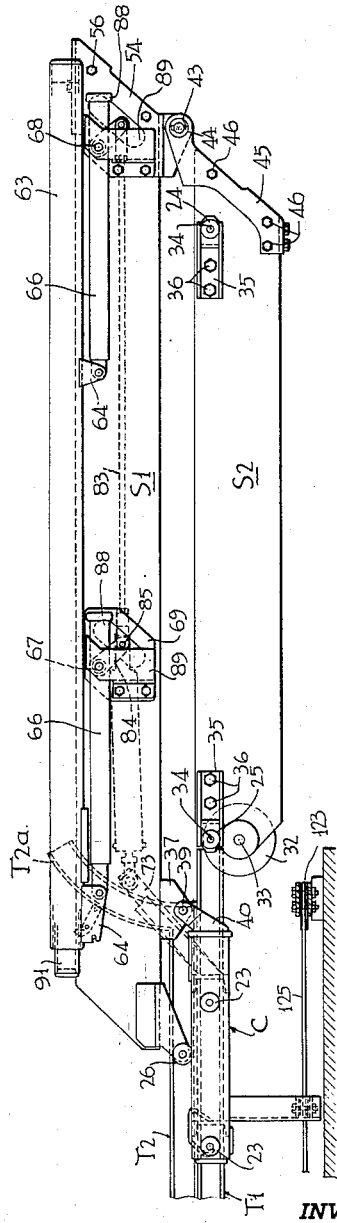

April 2, 1963 C. A. URIAN 3,083,784
MOVABLE STAIR ASSEMBLY
Filed July 26, 1961 9 Sheets-Sheet 8
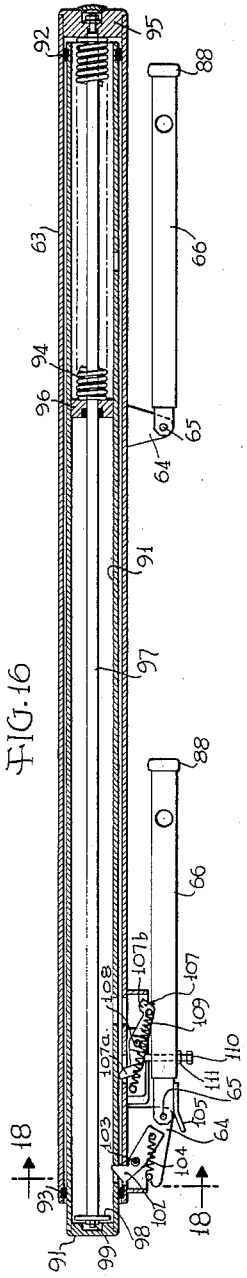
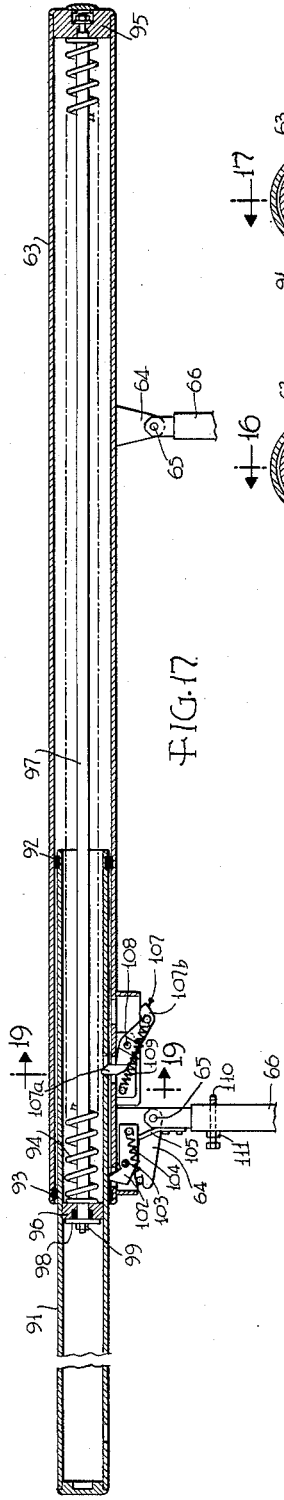
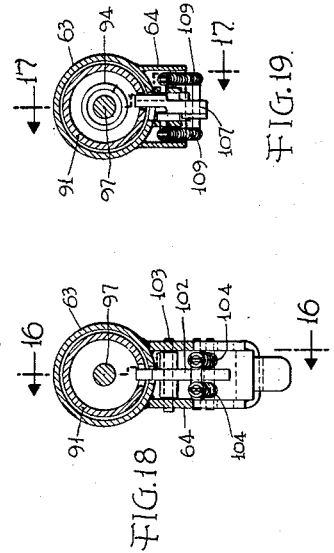
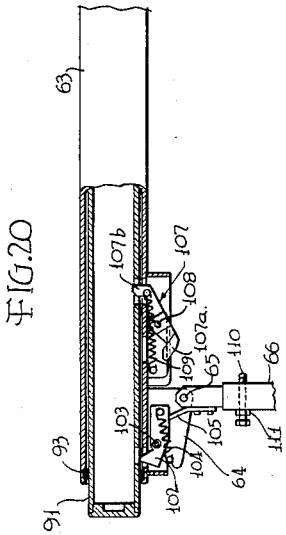
INVENTOR.
Charles A. Urian
BY
Wm. R. Glisson
ATTORNEY

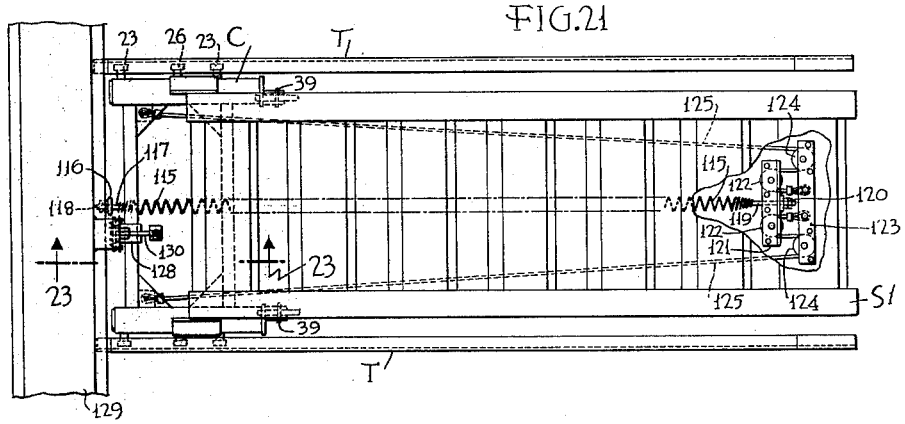
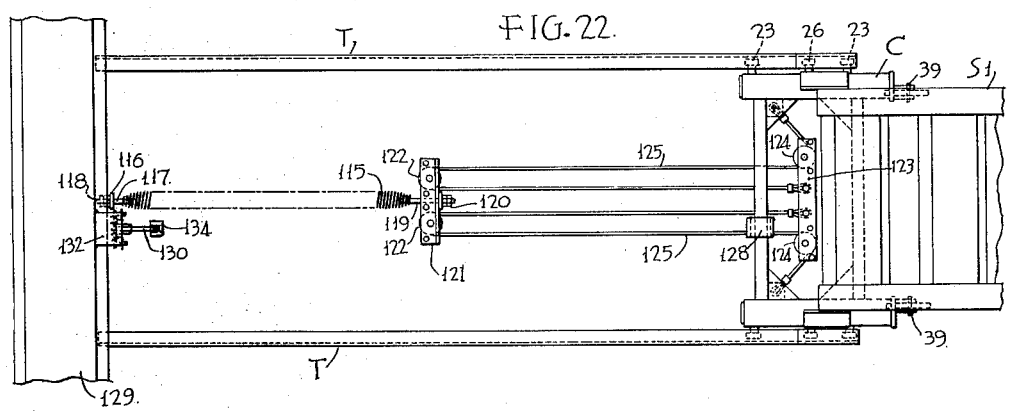
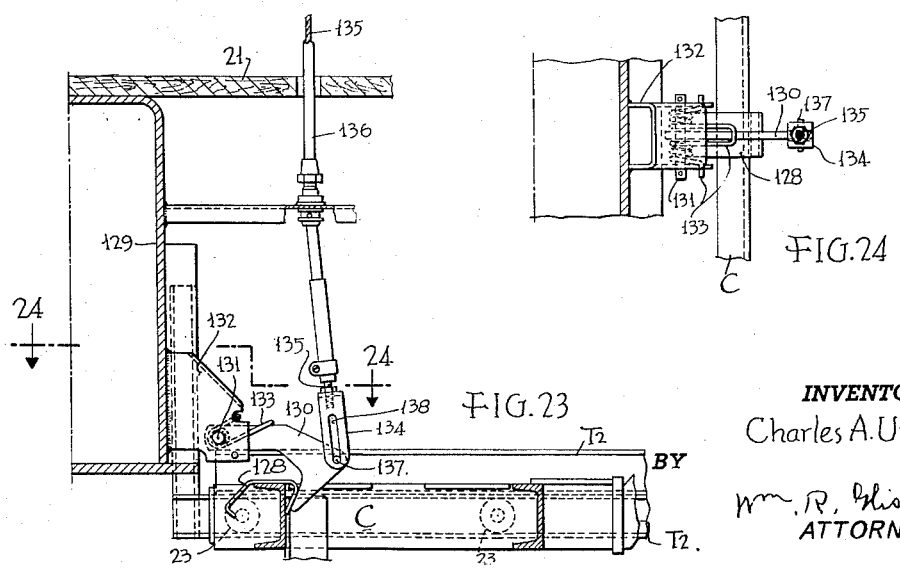

United States Patent Office 3,083,784
Patented Apr. 2, 1963

3,083,784
MOVABLE STAIR ASSEMBLY
Charles A. Urian, Abington, Pa., assignor to The Budd Company, Philadelphia, Pa., a corporation of Pennsylvania
Filed July 26, 1961, Ser. No. 127,002
10 Claims. (Cl. 182—88)

This invention relates to a movable star or step assembly and has for an object the provision of improvements in this art.

The movable stair assembly herein disclosed is especially adapted for use as an emergency passage between a high-level passanger space and the ground. Such a high-level space is to be found, for example, on a mobile lounge vehicle for transferring passengers between parked aircraft and airport terminal docks. The floor of such a mobile transfer vehicle is located at a considerable height of from seven to ten feet or more above the ground and since the normal loading level of aircraft or terminal is also high there is no need to provide fixed ground-access stairs on the vehicle. However, the occasion may arise where the vehicle is unable to establish a usual transfer connection or where there may be unusual conditions which make the rapid transfer of passengers to or from the ground desirable.

Accordingly, one of the particular objects of the present invention is to provide a stair assembly which is normally stowed in a non-obstructive position and which can be very quickly opened and set up for use.

Another object is to provide a movable stair assembly composed of foldable sections which are automatically unfolded when the stairs are set up and which are automatically folded when the stairs are stowed.

Another object is to provide movable stairs with a foldable handrail which operates as the stairs are set up and stowed.

Another object is to provide an extensible handrail which is projected automatically when the stairs are unfolded.

The above and other objects and advantages of the invention will be apparent from the following description of an exemplary embodiment, reference being made to the accompanying drawings wherein:

FIG. 1 is a side elevation of a vehicle having mounted thereon movable stairs embodying the present invention;

FIG. 2 is a reduced diagrammatic plan view of the stair end of the vehicle;

FIG. 3 is a reduced rear elevation;

FIG. 7 is a vertical section through the upper stair part or section in the position shown in FIG. 6;

FIG. 8 is a section taken about on the line 8—8 of FIG. 7 showing the handrail erecting mechanism but omitting the stair operating mechanism for clarity;

FIG. 9 is a view like FIG. 8 but showing the stair erecting mechanism and omitting the handrail erecting mechanism;

FIG. 10 is a somewhat diagrammatic side elevation, with the parts in the position shown in FIG. 5, to illustrate the action of the stair erecting mechanism;

FIG. 11 is a similar diagram showing the parts in the FIG. 6 position;

FIG. 14 is a vertical section through the stairs in folded position ready to begin opening or to be stowed to show the handrail erecting mechanism;

FIG. 15 is a corresponding side elevation;

FIG. 16 is a vertical section through the handrail in folded position, the view being taken on the line 16—16 of FIG. 18;

FIG. 17 is a similar section showing the handrail in erected and distended position, the view being taken on the line 17—17 of FIG. 19;

FIG. 18 is a transverse section taken on the line 18—18 of FIG. 16;

FIG. 19 is a transverse section taken on the line 19—19 of FIG. 17;

FIG. 20 is a partial section like FIG. 17 but showing the handrail extension telescoped into the main handrail section;

FIG. 21 is a top plan view with the stairs in stowed position, as in FIG. 4, to show the stair ejecting mechanism;

FIG. 22 is a similar view with the stairs in ejected position;

FIG. 23 is a partial vertical section, taken on the line 23—23 of FIG. 21, showing the stow latch operating mechanism; and FIG. 24 is a partial horizontal section taken on the line 24—24 of FIG. 23.

Figure 4:
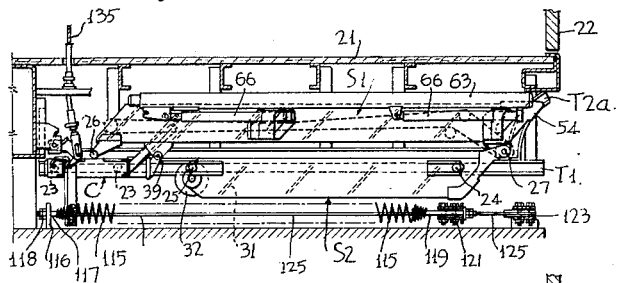
FIG. 4 is a side elevation of the stairs in folded position.
Figure 5:
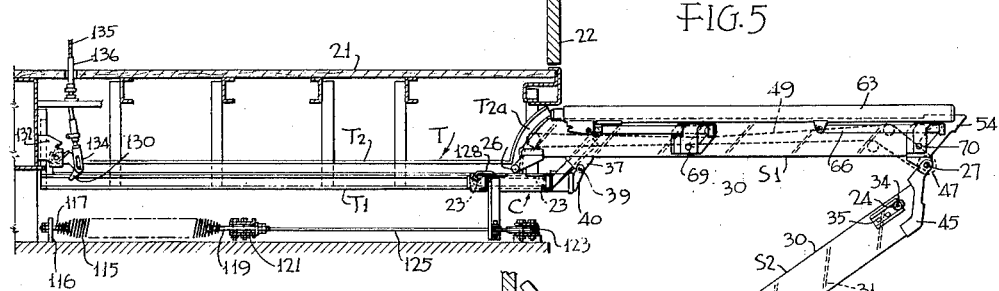
FIG. 5 is a view like FIG. 4 but with the stairs in partly unfolded position.
Figure 6:
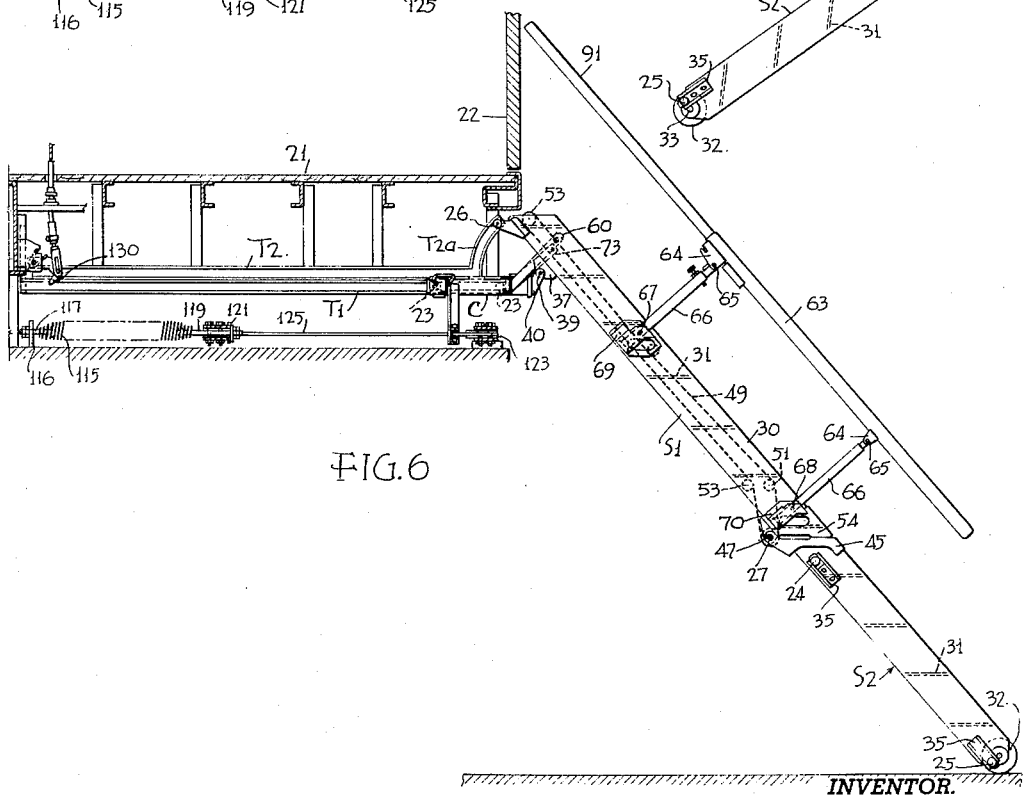
FIG. 6 is a view like FIG. 4 but with the stairs in fully open or use position.

The vehicle on which the movable stair assembly is mounted is shown here as a mobile lounge car 20 having a high level floor 21 for passengers. The vehicle is shown to be provided with two emergency stair assemblies or units S. Since they are alike only one will be described.

Normally the stair unit is folded and stowed in a space beneath the floor and the doorways of the passenger space are provided with doors 22.

Tracks T on each side are provided for the stairs and at each side the track includes a lower channel rail T1 for the rollers 23 of an operating carriage C and the stair support and guide rollers 24, 25; and an upper channel rail T2 is provided for a movement control roller 26. At its outboard end the rail T2 is provided with an upstanding portion T2a which guides the control roller 26 when the carriage has reached the outer end of its movement and the stairs are to be swung down or up about a support pivot axis on the carriage.

The stairs are made in two parts or sections S1 and S2 hinged together at a joint shaft 27 so that the lower section S2 folds up under the upper section S1. The sections each comprise inwardly facing channel-shaped stringers 30 and step treads 31 secured thereto, as by bolting and welding. Ground support rollers 32 are carried on spindles 33 at the lower end of the section S2. The track rollers 24 and 25 on each side are both mounted on the lower section S2, each on a spindle 34 carried by the outstanding end of a bracket 35 which is secured to the stringer, as by bolts 36.

The upper section S1 on each side is provided with a depending bracket 37, the bracket being hinged by a pivot pin 39 to a bracket 40 of the carriage C.

Figure 12:
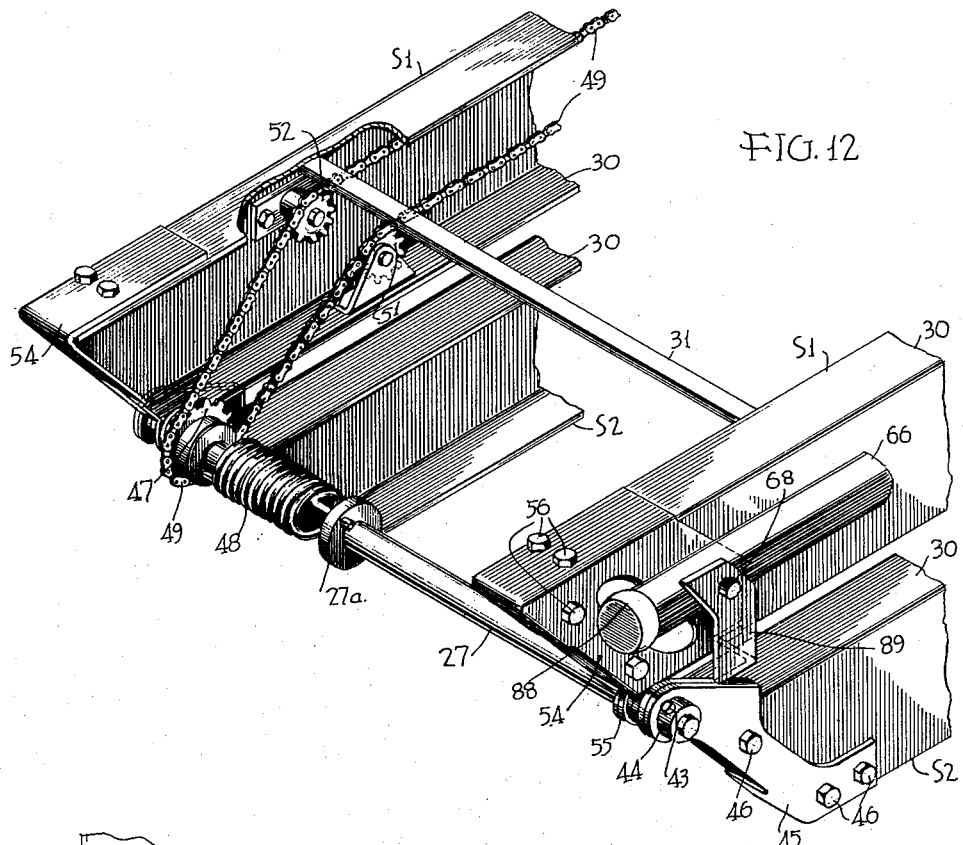
FIG. 12 is an isometric view showing the hinge zone between stair parts or sections with the sections folded up together.
Figure 13:
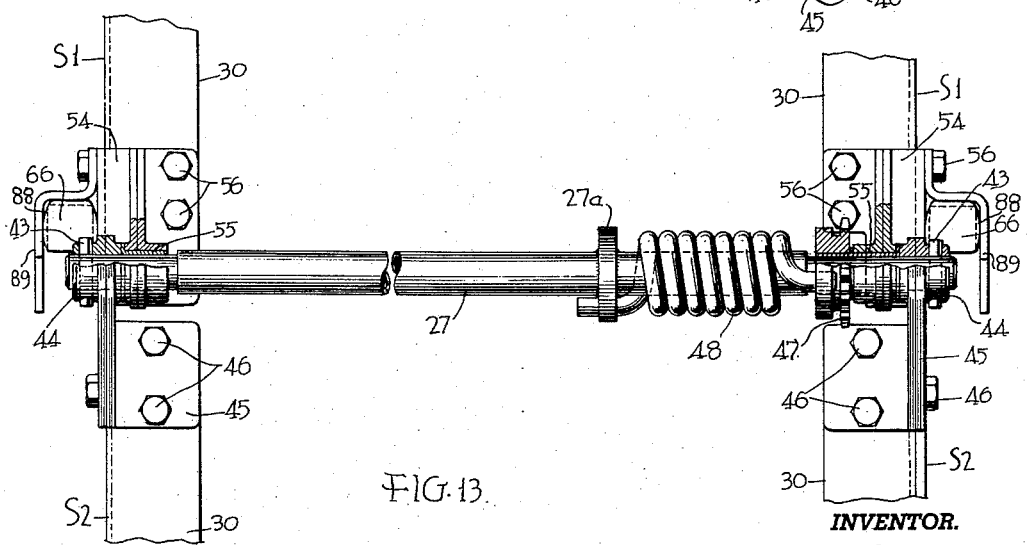
FIG. 13 is a bottom plan and section along the hinge line.

As best shown in FIGS. 12 and 13, the hinge shaft 27 is rigidly secured to the lower section S2, as by pins 43 which are carried by sleeves 44 made fast on hinge members 45 secured to the stringers by bolts 46; and the lower section is opened as the stairs descend, as by a sprocket 47 which is loose on the shaft and which turns the shaft through a torsion spring 48 connected to a collar 27a carried by the shaft. The sprocket 47 is turned by a sprocket chain 49 passing over lower idler guide sprockets 51 and 52 and an upper end idler sprocket 53, all of these idler sprockets being mounted on spindles carried by the upper stair section S1. The upper section S1 at its lower or outer end is provided with hinge members 54 having bearings 55 for the shaft 27 and the sprocket 47, the hinge members being secured to the stringers of the upper section, as by bolts 56.

The sprocket chain 49 is driven by the downward movement of the stairs, as by having its upper span secured to an upstanding bracket 60 secured to the carriage C. It will be seen that when the stairs are lowered about the support pins 39 with the sprocket chain made fast to the bracket 60, at a distance from the pins 39, the chain will be moved relative to the stairs and will turn the drive sprocket 47 in a direction to tighten the torsion spring 48 and open out the lower section. The movements are so determined that the lower section is fully opened before the upper section is fully opened and thereafter the chain and sprocket 47 merely wind up the spring 48 further without overloading the sprocket chain.

Handrails 63 are provided for the stairs and it is arranged that the handrails will be raised when the stairs are lowered and lowered when the stairs are stowed.

Each handrail 63 is provided with depending brackets 64 by which it is hinged, as by pivot pins 65, to the upper ends of support posts 66. The posts are pivoted, as by shafts 67 (upper) and 68 (lower), to the stringers 30 of the upper stair section, brackets 69 (upper) and 70 (lower) being secured to the outer sides of the stringers to carry the outer ends of the shafts 67, 68.

The post shafts 67, 68 extend through the webs of the stringers 30, and are provided with means for turning them to raise and lower the rails. It may be well to note here that there are two shafts 68 for the lower posts and a single shaft 67 for the upper posts.

The means for operating the post shafts 67 and 68 include an upstanding bracket 73 secured to the carriage C on the side opposite the bracket 60 for the sprocket chain. An operating rod 74 is secured on a stud pin 75 carried by the bracket 73, a spherical bearing being provided therebetween.

The operating rod 74 at its other end is connected to a crank pin 76 carried by a crank arm 77 secured to the shaft 67. Specifically the pin 76 is pivoted to a rod 78 of a telescopic member 74a slidable on the rod and urged away from the lower end of the rod by a spring 79 acting against a head 80 of the member 74a and a head 81 on the end of the rod 74. This arrangement takes up shock and provides for excess movement of the operating rod with the stairs after the rails have been fully erected.

The shafts 68 of the lower posts are operated through the movement of the upper shaft 67, the connections being through connecting rods 83 one of which is connected to pin 76 and the other of which is connected to shaft 67 by an arm 84 and pin 85 and connected to shafts 68 by arms 86 and pins 87. The rods 83 are adjustable in length to make the movements of the lower posts match the movements of the upper posts.

The lower ends of the posts 66 extend down below their pivot shafts and are provided with enlarged spherical elements 88 which wedge between flanking plates 89 when the posts are erect to hold them in position.

It is desirable to provide extensions to the handrails at one or both ends. Herein the extensions are provided at the upper end to place them in reach of passengers as they step on the stairs. It is arranged that the rail extensions, which telescope into the main rail portions, will be automatically extended when the rails are erected; but due to the expected use of the stairs it is not important that the rail extensions should be automatically retracted when the stairs are stowed. It is satisfactory to have an operator push them back into position and this obviates mechanism which would be needed to push them back automatically.

As shown, a telescopic extension 91, one for the upper end of each rail, is guided at the rear end by sleeve 92, as of quieting easy sliding material such as "Teflon," and at the front end by a sleeve 93 of like material carried within the main rail portion.

A compression spring 94 urges the extension 91 out of the main handrail portion, the spring at one end engaging a plug 95 secured in the back end of the main handrail portion and at its other end engaging a plug 96 secured within the extension. A rod 97 limits the movement of the extension, the rod at one end being secured to the plug 95 and at a distance being guided by a hole in the extension plug 96. The rod 97 has a washer 98 held by a nut 99 which engages the extension plug 96 to limit the outward movement of the extension.

A latch 102 is provided for holding the handrail extension in its retracted position, the latch being pivoted on a pin 103 carried by the main handrail portion and constantly urged toward latching position by springs 104. An operating plate 105 carried by a post engages the rear end of the latch 102 to disengage it and allow the handrail extension to snap out when the posts have been raised.

Means are provided for latching the handrail extensions in extended position, thus preventing them from being pushed back against their springs in normal use; and means are also provided for latching the handrail extensions in retracted position while the handrails and their posts are in the raised position and the latch 102 cannot function because of being held out by the plate 105.

As shown herein, a single latch 107 pivoted on a pin 108 carried by a bracket on the main handrail portion has an outboard latch projection 107a adapted to engage with an edge on the extension 91, as at a hole or the end of the rail extention, and an inboard projection 107b adapted to engage with an edge, as of a hole, on the extension. The main handrail portion, as for the projection of latch 102, is provided with openings for the latch projections 107a, 107b. The latch 107 is of the snap-action over-center type which is held in either over-center position by springs 109.

Normally and in stowed position, the outboard projection 107a is held in engagement with the outer surface of the rail extension. To insure that the latch will be held in this over-center position while stowed, the post is provided with an operator 110 in the form of an adjustable screw held in position by a locknut 111, the end of the screw engaging the back of the outboard end of the latch 107.

When the attendant pushes the rail extensions inward he throws the latches 107 back over center to cause the inboard projections 107b to engage the outer surface of the extensions; then when the extensions are pushed in, the projections 107b will enter holes in the extensions and hold them against outward movement until the rail posts fold down to remove the plates 105 from the latches 102 allowing these latches to engage in holes in the extensions. Later the inboard projections 107b of latches 107 are withdrawn by the operating screws 110 in preparation for the next opening of the stairs.

The carriage C is projected outwardly, as by one or more coil tension springs 115 (one shown) anchored at the inboard end to a fixed anchorage 116, as by a rod 117 having nuts 118 threaded thereon.

The outboard end of the spring 115 is connected to the carriage but, due to the limited length of the space available, the connection is indirect and the movement multiplied. As shown, the spring is connected, as by a rod 119 having nuts 120 threaded thereon, to a floating bar 121 carrying turnable cable sheaves or pulleys 122 thereon. A support or anchorage 123 near the outboard end carries turnable cable sheaves or pulleys 124. Cables 125 have one end secured to the support 123, the other end secured to the sides of the carriage, and between the ends pass in reverse direction over the pulleys 122 and 124.

By this arrangement the carriage is moved twice the distance of the change in length of the spring.

Means are provided for latching the carriage in stowed position. As shown herein, the carriage at the center is provided with a keeper 128 and, on a fixed anchorage 129 beneath the floor, there is provided a latch 130 pivoted on a pin 131 carried by a bracket 132 and urged toward holding position by a spring 133.

The latch is pulled up when the carriage is to be released, as by a pull link 134 carried by a pull cable or, as shown, by a flexible push-pull Bowden release cable 135 carried by a conduit 136. A pin 137 on the latch engages in a slot 138 in the link 134. The slot permits the latch to be pushed up automatically when the carriage is pushed back (the cable 135 and link 134 having been returned to lower position after the latch was pulled up) to engage the keeper 128, the spring 133 controlling movement of the latch. The keeper and latch have inclined surfaces causing the latch to ride over the keeper as the carriage is returned.

The operator 135, 136 extends to any convenient point or points of control on the vehicle. And, if desired, both stair units may be controlled from the same point or points. This requires no illustration since the particular points and routes are a matter of selection and the branching connection arrangements for either direction of movements are well known.

In operation, when it is desired to place the emergency stairs in position for use, the release cable 135 is pulled to release the latch 130. The cable 135 will at once be returned, either by return springs or by hand, to place the slot 138 of link 134 in its lower position so the latch can spring up again when necessary to relatch the carriage.

When the carriage C is released the power cables 125 and spring 115 force it outwardly as far as it will go. Its outward movement is halted by the engagement of the movement control roller 26 with the upstanding track rail portions T2a, Shortly prior to the time that the carriage movement is stopped the lower support rollers 25 of the lower step section S2 leave the open outer end of the lower rails T1 (the upper rollers 24 having left earlier) and the lower end of the lower step section drops down. It is snapped down by the coil spring 48, say for about 35° to 75° which is made the no-load position of the spring, and then rides further on the spring in its uncoiling direction.

When the carriage and the whole stair unit come to a stop, the movement control rollers 26 will move up in the upstanding rail portions T2a to allow the whole stair unit to swing down about the support pins 39 on the carriage.

As the stair unit drops, the bracket 60 to which the sprocket chain 49 is attached causes the chain to turn the shaft 27 and swing the lower stair section into extended position in alignment with the upper stair section and thereafter to wind up the torsion spring 48.

At the same time the bracket 73 to which the operating rod 74 is connected causes the rod to operate the shafts 67 and 68 and raise the posts and handrails into operative position.

When the handrails are in final position the plates 105 release the latches 102 and allow the handrail extensions to be forced out by their springs. Latches 107 hold the extensions in projected position. The operation of these latches has already been described.

When the stairs are to be stowed they are lifted by hand until the upper section is in a horizontal position, the handrail extensions having first been pushed in and latched. The lifting movement will automatically fold the handrails and bring the lower stair section up under the upper section. The lower section is lifted the rest of the way until it is close against the upper section. The rollers 25 at the lower end of the lower section are pushed into the end of the lower rails T1; and then the whole stair assembly is pushed back until the carriage is caught and held by the latch 130. As an aid in returning the stair assembly a pull rope or cable with suitable pulley or pulleys may be attached to the rear end of the carriage and pass to a suitable point of access. Or a ladder or platform may be provided to give the operator a more advantageous height for manipulating the stair assembly. Both aids can be used and, of course, more than one operator may be available for stowing the stair assembly.

For simplicity of disclosure certain refinements which make for easier and smoother operation have been purposely omitted. For example, shock absorbers can be used to ease the stop of the handrail extensions; shock absorbers can be used to ease the stop of the handrail posts when erected; shock absorbers and non-return-bounce latches can be used to ease the stop of the stair assembly in its outer position; side rollers can be used on the carriage and steps to guide accurately in the track movement; interlocks can be provided to prevent the doors 22 from opening until the stairs are down in the use position; and a protective door will, of course, be provided over the outer end of the stair recess space.

It is thus seen that the invention provides an improved and convenient stair assembly which can be easily and quickly put into position for use and which is very sturdy and dependable.

While one embodiment of the invention has been described for purposes of illustration it is to be understood that there may be various embodiments and modifications within the scope of the invention.

What is claimed is:

1. A movable stair assembly comprising in combination, a track, a carriage movable along said track, a foldable stair unit including an upper section and a lower section hinged thereto to swing under the upper section when folded up with it, means pivoting the upper stair section to the carriage, guide means supporting said stair unit for movement along said track, and operative means between said stair unit and said carriage which swings said lower section into alignment with the upper section when the upper section swings down about its pivot means on the carriage, said operative means including a device for turning the lower stair section about its hinge axis, and also including a resilient element which yields after the lower section is aligned with the upper section while the upper section moves further, said resilient element being a torsion spring which is of such strength and so arranged as to support said lower stair section at an angle below the upper stair section while the upper stair section is in its uppermost position.

2. A movable stair assembly comprising in combination, a track, a carriage movable along said track, a foldable stair section pivotally connected to said carriage for movement between a stowed position and an erected position, a handrail carried on posts hinged to said stair section, and means for swinging said posts and handrails up and down when the stair section swings on said carriage between said positions, said means for swinging the posts being operative to fully raise said posts prior to movement of said stair section into its erected position and including a fixed anchorage on said carriage located at one side of the stair section pivot on the carriage, and connections between the fixed anchorage and said posts for turning the posts on their hinge axes when the stair section moves about its pivot axis, said last mentioned connection including a shaft connected to one of said posts as its hinge axis, a crank arm on said shaft, a rod pivotally connected to said crank arm and to said fixed anchorage and a resilient element in said connection providing further hinging movement of the stair section after the handrail posts have been fully raised.

3. A movable stair assembly comprising in combination, a stair section hinged at its upper end to swing down at its lower end, spaced handrail posts pivoted to said stair section, a handrail pivoted to the tops of said posts, means for turning said posts about their pivot axes, a handrail extension telescopically mounted on said handrail, means urging said extension out of the handrail, means halting the outward movement of said extension, a latch for holding said extension in a stowed position on said handrail, and operating means carried by one of said posts for releasing the extension from the latch when the posts and handrail are fully erected.

4. A movable stair assembly as set forth in claim 3, which further includes a second latch for holding the extension in stowed position until said first-mentioned latch is released from its operating means.

5. A movable stair assembly, comprising in combination, an upper stair section hinged at its upper end to swing down at its lower end, a lower stair section hinged at its upper end to the lower end of said upper stair section, spaced handrail posts pivoted to said upper stair section, a handrail pivoted to the tops of said posts and servicing both stair sections, means for turning said posts about their pivot axes, a handrail extension telescopically mounted on said handrail, means urging said extension out of said handrail, means halting the outward movement of the handrail, a first latch for holding the handrail in its outer position, a second latch for holding the extension in a stowed position, and means for automatically releasing said second latch upon movement of said upper stair section into an erected position.

6. A movable stair assembly, comprising in combination, a stair section hinged at its upper end, spaced handrail posts pivoted on said stair section, a handrail pivoted to the tops of said posts, means for turning said posts about their pivots when the stair section is turned about its hinged axis, a handrail extension telescopically mounted on said handrail, a spring urging said extension out of haid handrail, stop means for limiting the outward movement of said extension, a first latch for holding the extension in its stowed position, a second latch for holding said extension in its extended position, means for releasing said first latch when the posts are erected, and a latch element on said second latch for holding the extension in stowed position until said first latch is released from the releasing means as the posts fold down.

7. A movable stair assembly as set forth in claim 6, which further include means for engaging said second latch when the posts are folded down to move it into position to engage and hold the extension extended when it is next released from the first latch and moved to its extended position.

8. A movable stair assembly comprising: a track; a carriage movable along said track; a foldable stair unit including an upper section and a lower section hinged thereto to swing under the upper section when folded up with it; means pivoting the upper stair section to the carriage; guide means supporting said stair unit for movement along said track; and operative means between said stair unit and said carriage which swings said lower section into alignment with the upper section when the upper section swings down about its pivot means on the carriage, said operative means comprising a sprocket mounted to turn their lower stair section about its hinge axis, a sprocket chain mounted on idler sprockets on the upper chain section, and a fixed anchorage on the carriage for one span of the sprocket chain at a distance from the pivot axis of the upper stair section to the carriage to cause the sprocket chain to turn when the upper stair section swings down.

9. A movable stair assembly adapted for use as an emergency passage from a vehicle such as a mobile lounge, said assembly comprising: track means adapted to be mounted on the vehicle; a carriage movable along said track means between first and second positions; means biasing said carriage towards said second position; releasable means for holding said carriage in said first position against the force of said biasing means; a foldable stair unit movable between a stowed position and an erected position, said stair unit comprising an upper section and a lower section hinged to said upper section for pivotal movement between a stowed position beneath said upper section and an erected position aligned with said upper section; means pivoting said upper section to said carriage so that when said carriage occupies said first and second positions said stair unit is stowed and erected respectively, the movement of said carriage from said first position to said second position upon release of said releasable means allowing movement of said stair unit into said erected position; a pair of handrails carried on posts hinged to said upper section; and means for automatically erecting said posts and handrails upon movement of said stair unit to said erected position.

10. An assembly in accordance with claim 9
wherein each of said handrails comprises
    a pair of telescopic members biased towards extended positions,
and said assembly further comprises
    latch means for holding said telescopic members in contracted positions,
    and means for automatically releasing said latch means upon erection of said stair unit.

References Cited in the file of this patent

UNITED STATES PATENTS

| | | |
|---|---|---|
| 2,531,263 | Fink | Nov. 21, 1950 |
| 2,873,904 | McCormick | Feb. 17, 1959 |
| 2,933,149 | Lee | Apr. 19, 1960 |
| 2,990,148 | James | June 27, 1961 |